United States Patent
Faynberg et al.

(10) Patent No.: US 7,752,440 B2
(45) Date of Patent: Jul. 6, 2010

(54) METHOD AND APPARATUS FOR REDUCING E-MAIL SPAM AND VIRUS DISTRIBUTION IN A COMMUNICATIONS NETWORK BY AUTHENTICATING THE ORIGIN OF E-MAIL MESSAGES

(75) Inventors: Igor Faynberg, East Brunswick, NJ (US); Hui-Lan Lu, Marlboro, NJ (US); Richard Perlman, Berkeley, CA (US); Zachary Zeltsan, Bronx, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1701 days.

(21) Appl. No.: 10/835,146

(22) Filed: Apr. 29, 2004

(65) Prior Publication Data

US 2005/0203985 A1 Sep. 15, 2005

Related U.S. Application Data

(60) Provisional application No. 60/552,052, filed on Mar. 9, 2004.

(51) Int. Cl.
*H04L 9/00* (2006.01)
(52) U.S. Cl. ...................................................... 713/168
(58) Field of Classification Search ............. 726/23–25; 713/168; 715/752
See application file for complete search history.

(56) References Cited

U.S. PATENT DOCUMENTS

| 6,321,267 | B1 | 11/2001 | Donaldson | 709/229 |
| 2002/0016824 | A1 | 2/2002 | Leeds | 709/207 |
| 2005/0015455 | A1* | 1/2005 | Liu | 709/207 |
| 2005/0182735 | A1* | 8/2005 | Zager et al. | 705/67 |
| 2006/0192990 | A1* | 8/2006 | Tonegawa | 358/1.15 |

OTHER PUBLICATIONS

G. Lindbergh, "RFC 2505, Anti-Spam Recommendations for SMTP TMAs", *IETF Request for Comments*, Feb. 28, 1999, pp. 1-24, XP002302818.

* cited by examiner

*Primary Examiner*—Gilberto Barron, Jr.
*Assistant Examiner*—Samson B Lemma
(74) *Attorney, Agent, or Firm*—John Ligon

(57) ABSTRACT

The proposed invention solves the problem of spoofing the origin to create e-mail spam, virus distribution, and other abuse of the electronic mail. In particular, it solves a notoriously dangerous problem of distributing computer viruses via e-mail allegedly sent from friends, colleagues, and well-respected organizations. The proposed invention defines a comprehensive set of mechanisms and apparatus to reasonably ensure that an e-mail message—when received by an e-mail gateway, e-mail relay server, or the destination e-mail server—has originated at the location and sent by a person (or a program) specified in its "From:" field.

13 Claims, 1 Drawing Sheet

METHOD AND APPARATUS FOR REDUCING E-MAIL SPAM AND VIRUS DISTRIBUTION IN A COMMUNICATIONS NETWORK BY AUTHENTICATING THE ORIGIN OF E-MAIL MESSAGES

RELATED APPLICATIONS

This non-provisional patent application claims the benefit of, provisional patent application U.S. Ser. No. 60/552,052, filed on Mar. 9, 2004.

TECHNICAL FIELD

This invention relates generally to the field of telecommunications and in particular to Internet message security.

BACKGROUND OF THE INVENTION

With the proliferation of the Internet, abuses of the electronic mail system are becoming increasingly problematic. These abuses include spoofing the origin (e.g., tricking or trying to make an origin look like a specific acceptable origin) to create e-mail spam, virus distribution, and other abuse of the electronic mail. In particular, a notoriously dangerous problem is the distribution of computer viruses via e-mail allegedly sent from friends, colleagues, and well-respected organizations.

There is no solution to date that effectively addresses the above problems, although the existing Internet standard does provide an option of checking whether the alleged sender of e-mail exists in the domain indicated in the "From:" field of the e-mail. This option is rarely used, however, perhaps because current perpetrators do have legitimate addresses at their disposal, thus, merely checking that the address is valid is not enough.

The existing e-mail standard (RFC 2821) and software allow anyone to send an e-mail message with any origin indicated in the From field. This feature (or rather vulnerability) has been exploited by advertisers to generate e-mail spam. A more sinister use—now more and more widespread—is distribution of computer viruses in messages sent to recipients from what appears to be their friends and colleagues.

The existing e-mail standard does allow to verify the sender, but this feature merely verifies that the address is correct (i.e., exists) in the existing domain. It does not verify whether this particular message has been sent from the particular address. Many mail servers ignore this feature precisely because it has become useless: e.g., a large number of valid e-mail addresses listed on the Internet, archived exchanges on various e-mail lists, and other sources (such as the information in the address books of the broken-into computers) give the spammers or crime perpetrators a sufficient number of addresses to use. Furthermore, search engines help in obtaining the lists of correspondents of potential targets, so the attacks are becoming more focused.

One way of dealing with the problem is certification and digital signing of every message, but this has not been implemented because it is costly and complex. More important, it will not be interoperable until it is deployed everywhere, but the costs and complexity make it very hard to deploy widely.

SUMMARY OF THE INVENTION

An advance is made over the prior art in accordance with the principles of the present invention that is directed to a method relating to the fields of security, spam prevention, AAA, Radius, and Internet messaging protocols. The proposed invention solves the problem of spoofing the origin to create e-mail spam, virus distribution, and other abuse of the electronic mail. In particular, it solves a notoriously dangerous problem of distributing computer viruses via e-mail allegedly sent from friends, colleagues, and well-respected organizations.

The proposed invention defines a comprehensive set of mechanisms and apparatus to reasonably ensure that an e-mail message—when received by an e-mail gateway, e-mail relay server, or the destination e-mail server—has originated at the location and sent by a person (or a program) specified in its "From:" field.

The invention ensures that any e-mail server in the relay chain to the end-point recipient of an e-mail message (i.e., a gateway, relay, or destination server) can properly ascertain whether the message has been sent by the person (or program) indicated in the From: field.

The invention operates by a) sending a query directly to the alleged originating server, or b) using a AAA server (such as Lucent Navis Radius server to perform this function. If the response to the query is negative, the message is discarded and, if necessary, a proper security log entry is generated.

The mechanism is new in that it authenticates the message (not only the alleged sender) in a variety of ways, each of which is simple to implement. It also avoids the previously proposed (but found hard to implement) mechanisms for use of certificates and other complex security mechanisms (such as electronic signatures) that may rely on complex key distribution, cryptography, etc. To this end it avoids costly implementation of PKI and integration of certificates of external trust centers

BRIEF DESCRIPTION OF THE DRAWING

The teachings of the present invention can be readily understood by considering the following detailed description in conjunction with the accompanying drawings, in which.

DETAILED DESCRIPTION

An exemplary embodiment of the invention will now be described while referring to the figures, several of which may be simultaneously referred to during the course of the following description.

The proposed invention is simple, and it eliminates the costs and complexity of using any type of cryptography (including digital signatures), certificates, or public key distribution mechanisms.

The invention ensures that any e-mail server in the relay chain to an end-point recipient of an e-mail message (i.e., a gateway, relay, or destination server) can properly ascertain whether the message has been sent by the person (or program) indicated in the From: field.

The invention operates by a) sending a query directly to the alleged originating server, or b) using a AAA server (such as Lucent Navis Radius server) to perform this function. If the response to the query is negative, the message is discarded and, if necessary, a proper security log entry is generated.

Figure 1:
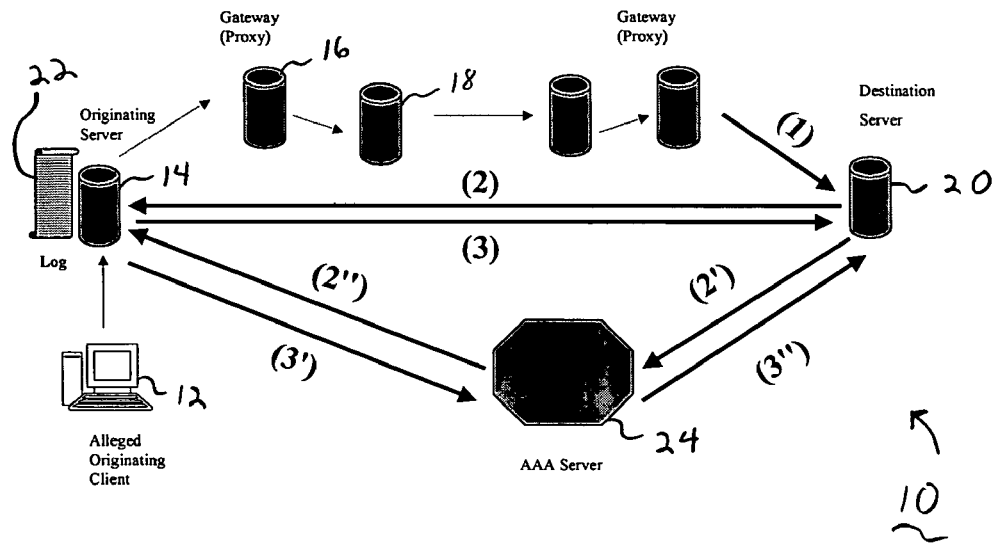
FIG. 1 shows in simplified block diagram form elements used in practicing our inventive method.

The mechanism is new in that it authenticates the message (not only the alleged sender) in a variety of ways, each of which is simple to implement. It also avoids the previously proposed (but found hard to implement) mechanisms for use of certificates and other complex security mechanisms (such as electronic signatures) that may rely on complex key distribution, cryptography, etc. To this end it avoids costly implementation of PKI and integration of certificates of external trust centers FIG. 1 shows an exemplary portion of a network 10 depicting a typical e-mail path used to describe the invention. Here, a client 12 sends a message via its server 14, which passes the domain gateway 16 and other proxy servers 18, each of which, starting from the originating 14 server employs the Simple Mail Transfer Protocol (SMTP) described in RFC 2821. When the message arrives at a destination server 20, it is sent to the appropriate recipient (not shown). Note that the originating server 14, destination server 20, proxy servers 18 and gateways 16 all perform the role of the mail transfer agent as defined in RFC 2821.

With reference to FIG. 1, one exemplary embodiment of the invention operates as follows:

1. Whenever an originating server 14 receives a request for forwarding e-mail from the originating client 12, it performs the following steps:
   a. Checks if the From: field in the email header points to a mailbox on the server. If so, it forwards the email. Otherwise, it rejects the email with, for example, a permanent, negative completion reply per RFC 2821.
   b. The invention also logs the successfully forwarded email (or possibly, some part of it, or even a hash of it determined by a locally selected hashing algorithm). The entry in the log is to be maintained for a certain period of time (typically, for example, not exceeding 10 minutes).

2. In an exemplary embodiment of the invention, any other server in the chain may perform the steps described below. The destination server 20 must perform them. These steps can be performed in a number of alternative ways as would be understood by persons skilled in the art:
   a. (Option 1): When a message transfer starts (as depicted by arrow label (1)), and the alleged origin of the message (as passed in the From: field of SMTP) is known, the server 20 initiates a short session (such as TCP session) with, or a transaction to, the originating server 14 by sending a query labeled (2). This query asks whether the originating message identified by one or more of a set of parameters (such parameters may include, but not be limited to: the From: field, time of day, length, subject line, selected contents, or any other set of message-specific parameters, including all of the above) has been actually sent by the indicated user.

The following describes a possible query format (where the syntax is modeled after SMTP). A query consists of a command followed by the arguments: CONFIRM <Message-ID> <message-specific-parameters>. Where CONFIRM is a command name, the <Message-ID> argument contains a unique identifier of the message (as specified in RFC 822) and the <message-specific-parameters> argument contains a list of the described above parameters that could be used for the message identification. Upon reception of the query the originating server using the unique Message-ID checks its logs to verify whether the message received in the query Message-ID was sent. If not, then a corresponding reply is sent to the receiving server. In this exemplary embodiment, if the message identified by the Message-ID was logged, then the originating server would be capable to make a decision on the message's authenticity by comparing information in the logged message with information received in the query's <message-specific-parameters> argument. That decision will be sent in response to the query.

The following is an example of a query: CONFIRM <406C9526.2060307@agere.com> <From: abc@agere.com>. Upon reception of this query the originating server would be able to retrieve the referenced by 406C9526.2060307@agere.com message and check if the "abc" is among the aliases associated with the sender of the message. The sender's identifier would be known to the originating server since it was given as an argument to the SMTP command MAIL FROM: <reverse-path> [RFC 2821] that was executed when the message was originated.

The proposed query would work for an overwhelming majority of messages that have a unique Message-ID as described in RFC 822. Although this standard specifies the Message-ID field as optional, most SMTP servers include this field into its e-mail messages. In cases where this field is absent, the receiving server can act according to a local policy (e.g. abort the message, send a warning to a recipient etc.)
   b. Upon reception of the query, the originating server 14 checks its log 22 and responds with a message (3) having information as to whether the originated message was sent by the indicated user.
   c. If it responds in the affirmative, the receiving (destination) server 20 continues processing and forwarding the e-mail message. Otherwise, the process may be aborted at once. The result of an abort is that the message is not stored or forwarded. An abort could be further carried out in a number of different ways. For instance, one manner of carrying out an abort is to cause a time-out or else create and send a message, such as "recipient non-existent". Other such ways to halt communications in such a manner so as to discourage any further attack are also envisioned herein. As would be understood, any server involved may also make an appropriate security log entry as dictated by its security policy, or take any other security-related action, such as notification to an appropriate enforcement agency.
   d. (Option 2): In another alternate embodiment, the destination server 20 asks an appropriate Authentication, Authorization, and Accounting (AAA) server 24 to authenticate the message and authorize its reception (message 2'). The AAA server 24 then performs its own exchange with the originating server 14 (messages 2" and 3'), makes an appropriate decision, and responds with this decision to the querying server with message 3").
   e. If the originating server 14 (and the AAA server) respond in the affirmative, the destination server 20 continues processing and forwarding the e-mail message. Otherwise, the destination server aborts the process at once. Any server involved may also make an appropriate security log entry as dictated by its security policy, or take any other security-related action. It would also be understood that once the AAA server queries the originating server that the originating server could also respond directly to the destination server or alternatively, the AAA could be involved in only the response phase of the communications.

Figure 2:
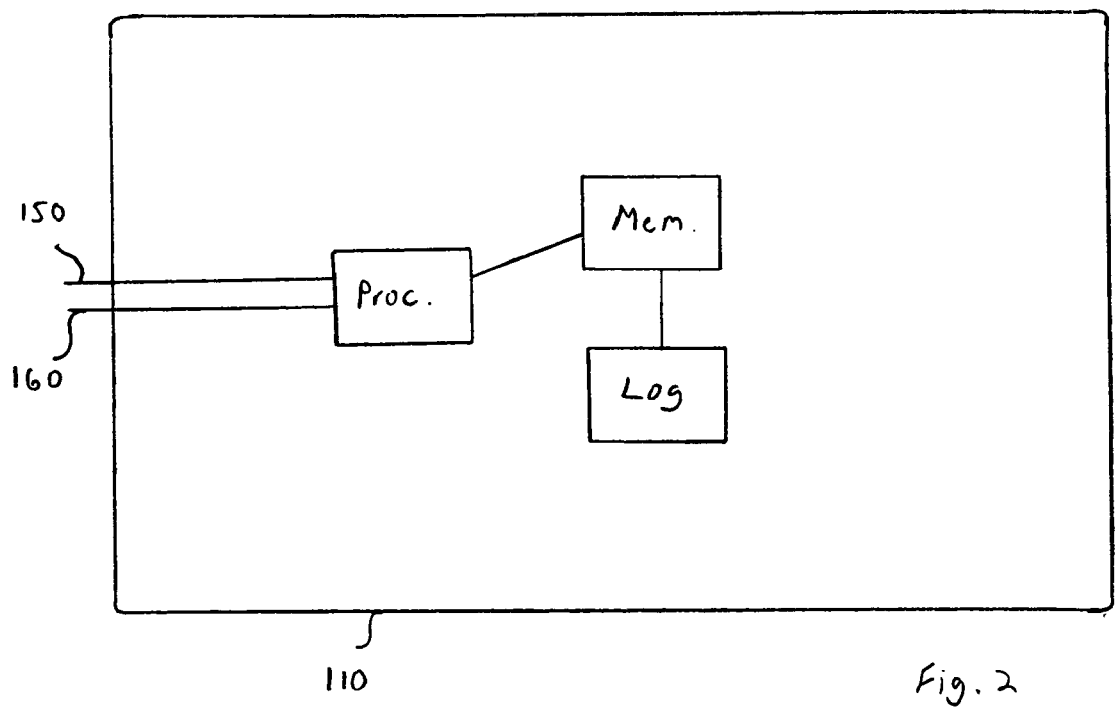
FIG. 2 is an exemplary block diagram of a server device in accordance with the invention.

FIG. 2 shows an exemplary block diagram of a server device 110 according to the present invention. In general, the device includes at least two functional blocks, which operate in connection with a processor 120. A first block 130 is a log where received transmissions are stored as has already been explained. A next block 140 is a memory device for storing instructions, for example in software, in order to carry out the methodologies of the present invention. As would be understood, the log could also be part of the overall memory for the device. The server device also includes input and output ports 150, 160. In addition, although the functionality of the invention is described with respect to a server, it would be understood that the invention may also reside in a proxy device or other like device associated with a server.

For clarity of explanation, the illustrative embodiment of the present invention has been described as comprising individual functional blocks and/or boxes. The functions these blocks and/or boxes represent may be provided through the use of either shared or dedicated hardware, including, but not limited to, hardware capable of executing software. Use of the term "processor" should not be construed to refer exclusively to hardware capable of executing software. Further, the illustrative embodiment may comprise digital signal processor (DSP) hardware, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims.

What is claimed is:

1. A method of authenticating an email message origin in a communications network, said method comprising the steps of:

receiving at an originating server of said e-mail message (14) a query from a downstream server (16, 18, 20, 24) to determine whether said email message was sent by an indicated user, wherein said originating server is arranged to check an identification field of an incoming email message to determine if it corresponds to a mailbox serviced by the originating server and to create a log entry for received e-mail messages satisfying that criteria;

checking logged data at said originating server to determine whether said email message corresponds to a message sent from said originating server in response to said query; and responding to said query to authenticate said email message origin.

2. The method of claim 1, further including the steps of checking if a "From" field in a message header of said e-mail message corresponds to a mailbox serviced by an originating server when said originating server receives a request for forwarding an email; and logging data identifying said email message, if said "From" field successfully corresponds to a mailbox serviced by said originating server.

3. The method of claim 1, wherein said query is received from a destination server.

4. The method of claim 1, wherein said query is received from an authentication server.

5. The method of claim 4, wherein said authentication server receives a request to authenticate from a destination server.

6. The method of claim 1, wherein said query is initiated using a TCP session.

7. The method of claim 1, wherein an originating message is identified by one or more of a set of parameters selected from the group consisting of: From: field, time of day, length, subject line, selected contents, and other message-specific parameters.

8. A method of authenticating an email message origin at a destination server (20) in a communications network, wherein an originating server (14) checks if a "From" field in an email message header corresponds to a mailbox serviced by the originating server when said originating server receives a request for forwarding an email and logs data identifying said email message, if said email message successfully corresponds to said originating server, said method comprising the steps of:

sending a query to said originating server from said destination server to determine whether said email message was sent by an indicated user;

receiving a response to said query to determine whether said message was authenticated, said response including information as to whether said email message corresponds to said logged data and to said originating server.

9. The method of claim 8, wherein said query is sent to said originating server.

10. The method of claim 8, wherein said query is sent to an authentication server.

11. The method of claim 8, wherein said query is initiated using a TCP session.

12. The method of claim 8, wherein an originating message is identified by one or more of a set of parameters selected from the group consisting of: From: field, time of day, length, subject line, selected contents, and other message-specific parameters.

13. A method of authenticating an email message origin in a communications network, said method comprising the steps of:
- checking at an originating server (14) if a "From" field in a message header of said email message corresponds to a mailbox serviced by the originating server when said originating server receives a request for forwarding an email;
- logging data identifying said email message, if said "From" field successfully corresponds to a mailbox serviced by said originating server;
- sending a query from a destination server (20) to said originating server to determine whether said email message was sent by an indicated user;
- checking said logged data at said originating server to determine whether said email message corresponds to said originating server;
- responding to said query to authenticate said email message; and
- receiving said response at said destination server.

* * * * *